United States Patent
Asano et al.

(10) Patent No.: US 6,774,169 B1
(45) Date of Patent: Aug. 10, 2004

(54) LOW-ELECTROSTATICALLY-CHARGING GRANULAR POLYTETRAFLUORETHYLENE POWDER AND PREPARATION PROCESS OF SAME

(75) Inventors: Michio Asano, Settsu (JP); Kenji Futatsugi, Settsu (JP); Masayuki Tsuji, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 09/508,252

(22) PCT Filed: Sep. 3, 1998

(86) PCT No.: PCT/JP98/03946

§ 371 (c)(1),
(2), (4) Date: Mar. 8, 2000

(87) PCT Pub. No.: WO99/12996

PCT Pub. Date: Mar. 18, 1999

(30) Foreign Application Priority Data

Sep. 8, 1997 (JP) .............................. 9-243138

(51) Int. Cl.[7] ................................. C08K 5/06
(52) U.S. Cl. ...................... 524/377; 524/546
(58) Field of Search ................. 524/377, 546

(56) References Cited

U.S. PATENT DOCUMENTS

| | | | |
|---|---|---|---|
| 3,627,838 A | 12/1971 | Ilnyckyj et al. | |
| 3,882,217 A | 5/1975 | Banham et al. | |
| 3,915,916 A | 10/1975 | Leverett | |
| 4,230,811 A | 10/1980 | Ilnyckyj | |
| 4,354,011 A | 10/1982 | Ilnyckyj | |
| 4,370,436 A | 1/1983 | Nakamura et al. | |
| 4,665,113 A | 5/1987 | Eberl | |
| 5,216,068 A | 6/1993 | Zipplies | |
| 5,576,381 A | 11/1996 | Bladel et al. | |
| 6,037,402 A | * 3/2000 | Asano et al. | 524/545 |
| 6,440,559 B1 | * 8/2002 | Asano et al. | 428/402 |

FOREIGN PATENT DOCUMENTS

| | | | |
|---|---|---|---|
| DE | 25 15 805 | 4/1975 | |
| DE | 0 432 718 | 6/1991 | |
| JP | 4-309548 | 11/1992 | ........... C08L/27/18 |
| JP | 5-39360 | 2/1993 | ............. C08J/3/12 |
| JP | 8-208929 | 8/1996 | ........... C08L/27/18 |
| JP | 9-241387 | 9/1997 | ............. C08J/3/12 |
| JP | 10-298300 | 11/1998 | ............. C08J/3/12 |

OTHER PUBLICATIONS

International Serch Report.
International Preliminary Examination Report for PCT/JP98/03946.

* cited by examiner

Primary Examiner—Peter D. Mulcahy
(74) Attorney, Agent, or Firm—Sughrue Mion, PLLC

(57) ABSTRACT

To provide a granular PTFE powder having a low electrostatic charging property even after drying. A process for preparing a low-electrostatically-charging granular polytetrafluoroethylene powder by contacting a polar group-containing organic compound having an electrostatic charging-preventing ability when substantially dry to a granular polytetrafluoroethylene powder and then drying the granular powder while the polar group-containing organic compound is kept remaining in the granular powder.

6 Claims, 1 Drawing Sheet

LOW-ELECTROSTATICALLY-CHARGING GRANULAR POLYTETRAFLUORETHYLENE POWDER AND PREPARATION PROCESS OF SAME

TECHNICAL FIELD

The present invention relates to a granular polytetrafluoroethylene (PTFE) powder having a low-electrostatically-charging property and a preparation process thereof.

BACKGROUND ART

PTFE, particularly PTFE prepared by suspension polymerization is, after once pulverized to an average particle size of not more than 100 μm, granulated by various granulation methods such as a dry granulation method, a method of granulation in the state of emulsion, a granulation method in the state of aqueous dispersion and a method of granulation by wetting and if necessary, subjected to shaping into a granular powder having an average particle size of about 100 to 600 μm. The granular powder after the shaping is used as a molding powder for powder molding.

However since PTFE has electrically insulating property, it is easily charged when dry, its powder flowability is lowered and in addition, it sticks to a transportation pipe and a molding die. Once PTFE powder sticks thereto, complicated steps are required when changing to other product, and it is impossible to change from PTFE to other product particularly when PTFE is transported through the pipe.

Therefore it is proposed that after granulation, a granular powder is treated with an aqueous solution of ion-dissociative substance (electrolyte) such as an inorganic acid or inorganic salt to electrically neutralize static electricity (JP-B-53-13230). However in that method, though the charged granular PTFE powder can be once neutralized electrically, there is no effect on prevention of electrostatic re-charging caused by a friction at transporting and molding the powder after drying since the electrolyte is used.

The present inventors have found that a granular PTFE powder granulated in the presence of a surfactant has unexpectedly low-electrostatically-charging property, and as a result of further investigations, have found that a polar group of the surfactant has a function to prevent electrostatic charging and exhibits an electrostatic charging-preventing ability at the time when the powder is substantially dry, concretely when it is transported and is molded after drying. Thus the present invention was completed.

An object of the present invention is to provide a low-electrostatically-charging granular PTFE powder which can maintain an electrostatic charging-preventing ability even after dried substantially, and a preparation process thereof.

DISCLOSURE OF THE INVENTION

The present invention relates to a process for preparing a low-electrostatically-charging granular PTFE powder by contacting a granular PTFE powder to a polar group-containing organic compound having an electrostatic charging-preventing ability after the powder is dried substantially, and then drying the granular PTFE powder with the polar group-containing organic compound being left contained in the powder.

In that preparation process, it is preferable that after the polar group-containing organic compound in the form of an aqueous solution is contacted to the granular PTFE powder, the granular powder is dried without washing.

The effect of the present invention can be exhibited particularly when the granular PTFE powder contains no filler or when even if the filler is contained, the filler is an electrically insulating filler.

As a polar group-containing organic compound which has an electrostatically charging-preventing ability after dried substantially, preferred is a surfactant, particularly an anionic surfactant or nonionic surfactant. In case where the surfactant is used in the form of an aqueous solution, it is preferable that a content thereof is 1 to 30,000 mg/liter, particularly 25 to 10,000 mg/liter.

Further the present invention relates to the granular PTFE powder containing a polar group-containing organic compound in an amount of 10 to 300 ppm and having an electrostatic charge of not more than 50 V, preferably not more than 10 V.

BEST MODE FOR CARRYING OUT THE INVENTION

Figure 1:
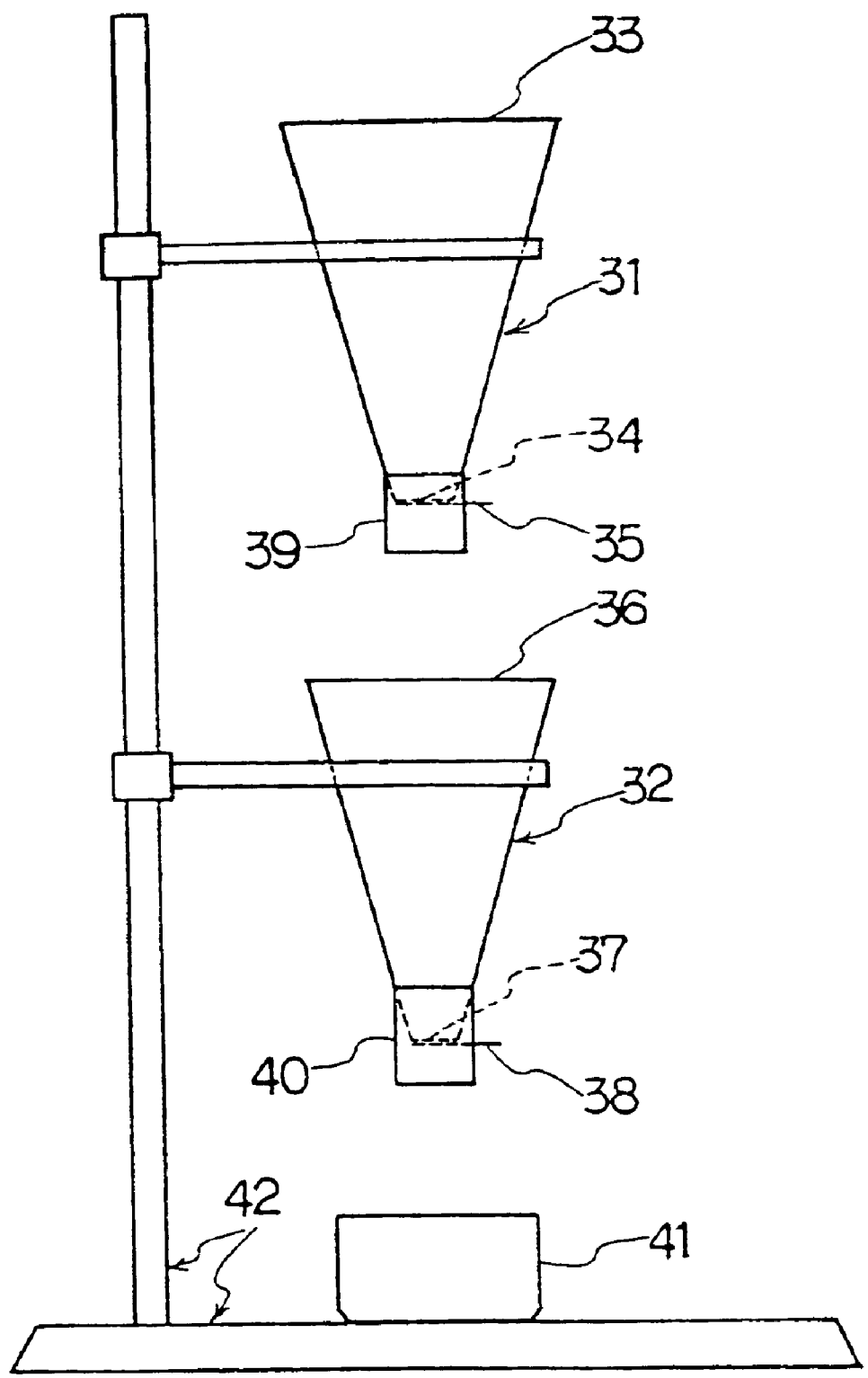
FIG. 1 is a diagrammatic view of an apparatus used for determining flowability of the granular powder in examples.

The granulation method of the granular PTFE powder which can be used in the preparation process of the present invention is not limited, and the granular PTFE powder can be prepared by various granulation methods (JP-B-44-22619, JP-B-44-22620, JP-B-60-21694, JP-A-3-259925, JP-A-9-52955, WO97/15611 and WO97/11111). Also the preparation process of the present invention is effectively applied particularly to a granular PTFE powder containing no filler with the electrostatic charge problem and a granular PTFE powder containing an electrically insulating filler. With respect to a granular PTFE powder prepared by a granulation method using a surfactant at granulating, for example, a granulation method in the state of emulsion or PTFE containing an electrically conductive filler, an amount of a polar group-containing organic compound having electrostatic charging-preventing ability (hereinafter in some cases referred to simply as "electrostatic charging-preventing compound") may be decreased.

JP-A-3-255133 discloses a method of removing a hydrophobic filler sticking to a surface of a filler-containing granular PTFE powder by stirring and washing with an aqueous solution of a surfactant. However since this method intends to wash the filler on the granular PTFE powder with an aqueous solution of a surfactant, an electrostatic charging-preventing property seems not improved because the surfactant is removed by washing with water after treatment. Further that patent publication discloses neither lowering of an electrostatic charging property nor electrical properties of the granular powder after treatment.

As PTFE used in the present invention, there may be used tetrafluoroethylene homopolymer or a modified PTFE containing a copolymerizable component in an amount of not more than 5% in a range not losing non-melt-processability. The granular powder may be subjected to the treatment of the present invention for lowering electrostatic charge as it is after the granulation or after a step for shaping of the granular powder. The granular powder may be subjected to such treatment after once dried or in the form of being wetted with water.

Filler-containing granular PTFE powders to be used are those prepared by known processes. As mentioned above, the present invention is applied effectively in case where a powder contains an electrically insulating filler which involves a problem with electrostatically charging property. Examples of the electrically insulating filler are, for instance, inorganic fillers such as glass fiber and powder, molybdenum disulfide powder and fluorinated mica powder; organic fillers such as a wholly aromatic polyester resin powder, polyimide powder, polyphenylene sulfide powder and tetrafluoroethylene-perfluoro(alkyl vinyl ether) copolymer powder; and the like. Examples of the electrically conductive filler are, for instance, metal fibers or metal powders such as bronze powder, gold powder, silver powder and stainless steel powder, coke powder, carbon fiber, and the like. Among them, it is preferable that hydrophilic fillers such as glass fiber are previously surface-treated with a surface-treating agent such as aminosilane to be hydrophobic.

The electrostatic charging-preventing compound may be a polar group-containing organic compound having an electrostatic charging-preventing ability when substantially dry. Examples of the preferred electrostatic charging-preventing compound are a surfactant, polymethyl methacrylate, polyurethane, and the like. Among them, a surfactant having no effect on physical properties of a fluorine-containing resin is preferable.

As the surfactant, any of anionic, cationic and nonionic surfactants can be used. In the present invention, since a desired effect can be obtained by letting the surfactant remain in the granular powder, anionic and nonionic surfactants, particularly a nonionic surfactant are preferable from the viewpoint of being easily kept remaining in a fluorine-containing resin.

As the anionic surfactant, there can be used known ones, for example, higher fatty acid and its salt, alkyl sulfate, alkyl sulfonate, alkyl aryl sulfonate, alkyl phosphoric acid ester, and the like. Particularly preferable anionic surfactants are a sulfate of higher alkyl alcohol, for example, sodium lauryl sulfate or a fluorine-containing sulfonic acid type- or carboxylic acid type-anionic surfactant having a fluoroalkyl group or chlorofluoroalkyl group. The typical compounds thereof are those represented by the formula (V):

$$X(CF_2CF_2)_n(CH_2)_mA \quad (V)$$

or the formula (VI):

$$X(CF_2CFCl)_n(CH_2)_mA \quad (VI)$$

wherein X is hydrogen atom, fluorine atom or chlorine atom, n is an integer of 3 to 10, m is 0 or an integer of 1 to 4, A is carboxyl group, sulfonic acid group or an alkali metal or ammonium residue thereof.

From the viewpoint that coloration of a molded article is difficult to arise when it is sintered by heating, an anionic surfactant having a perfluoroalkyl group or perchlorofluoroalkyl group as a hydrophobic group is preferable.

Examples of the polar group of the anionic surfactant are a sulfonic acid group, sulfuric acid ester group, phosphoric acid ester group, and the like.

Examples of the above-mentioned nonionic surfactant are, for instance, polyoxyethylamine oxides, alkylamine oxides, polyoxyethylene alkyl ethers, polyoxyethylene alkyl phenyl ethers, polyoxyethylene fatty acid esters, sorbitan fatty acid esters, polyoxyethylene sorbitan fatty acid esters, glycerine esters, polyoxyethylene alkylamine, segmented polyalkylene glycols having a hydrophobic segment comprising poly(oxyalkylene) unit having 3 or 4 carbon atoms and a hydrophilic segment comprising poly(oxyethylene) unit, the derivatives thereof, and the like.

More particularly, examples of the polyoxyethylamine oxides are dimethyloxyethylamine oxide, and the like.

Examples of the alkylamine oxides are dimethyllaurylamine oxide, dimethyloleylamine oxide, and the like.

Examples of the polyoxyethylene alkyl ethers are polyoxyethylene lauryl ether, polyoxyethylene cetyl ether, polyoxyethylene stearyl ether, polyoxyethylene oleyl ether, polyoxyethylene behenyl ether, and the like.

Examples of the polyoxyethylene alkyl phenyl ethers are polyoxyethylene nonyl phenyl ether, polyoxyethylene octyl phenyl ether, and the like.

Examples of the polyoxyethylene fatty acid esters are polyoxyethylene monolauric acid ester, polyoxyethylene monooleic acid ester, polyoxyethylene monostearic acid ester, and the like.

Examples of the sorbitan fatty acid esters are sorbitan monolauric acid ester, sorbitan monopalmitic acid ester, sorbitan monostearic acid ester, sorbitan monooleic acid ester, and the like.

Examples of the polyoxyethylene sorbitan fatty acid esters are polyoxyethylene sorbitan monolauric acid ester, polyoxyethylene sorbitan monopalmitic acid ester, polyoxyethylene sorbitan monostearic acid ester, and the like.

Examples of the glycerine esters are monomyristic acid glyceryl, monostearic acid glyceryl, monooleic acid glyceryl, and the like.

Examples of the derivatives of the above surfactants are, for instance, polyoxyethylene alkyl phenyl-formaldehyde condensate, polyoxyethylene alkyl ether phosphate, and the like.

As the segmented polyalkylene glycols having a hydrophobic segment and hydrophilic segment, preferable are, for example, those represented by the formula (IV):

$$H-(OCH_2CH_2)_q-(A)_p-(CH_2CH_2O)_q-H \quad (IV)$$

wherein A is

p is an integer of 5 to 200, q is an integer of 2 to 400. From the viewpoint of being easily adsorbed in the PTFE resin, it is preferable that p is from 15 to 40 and q is from 7 to 100.

Among them, preferable are amine oxides, polyoxyethylene alkyl phenyl ethers and segmented polyalkylene glycols. Further preferable are polyoxyethylamine oxide and

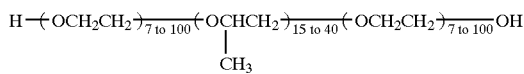

From the viewpoint that coloration of a molded article is difficult to arise when it is sintered by heating, a nonionic surfactant having a hydrophobic segment comprising poly(oxyalkylene) unit having 3 or 4 carbon atoms and a hydrophilic segment comprising poly(oxyethylene) unit is preferable.

Examples of the polar group of the nonionic surfactant are a polyoxyethylene moiety, polyoxypropylene moiety, polyoxybutylene moiety, and the like.

Examples of the cationic surfactant are, for instance, polyvinylbenzyltrimethylammonium chloride, a quaternary compound of polydimethylaminoethyl methacrylate, polydiallyldimethylammonium chloride, and the like.

Example of the polar group of the cationic surfactant is an ammonium salt moiety.

As a method of contacting an electrostatic charging-preventing compound to a granular PTFE powder, there are:

(1) a method of pouring the granular PTFE powder into an aqueous solution of electrostatic charging-preventing compound, (2) a method of spraying an aqueous solution of electrostatic charging-preventing compound to the granular PTFE powder, (3) a method of pouring an electrostatic charging-preventing compound into a granulation tank immediately after granulation (shaping) of the granular PTFE powder, and the like method. Among them, from the viewpoint of production cost, the method (3) is preferable.

By making such a contact, the electrostatic charging-preventing compound is stuck to the granular PTFE powder. The granular PTFE powder is dried with the electrostatic charging-preventing compound being stuck to and remaining on the granular PTFE powder, if necessary, after separating an excess aqueous solution of the electrostatic charging-preventing compound.

In the present invention, since the electrostatic charging-preventing compound is required to be kept remaining on the granular PTFE powder, it is not particularly necessary to wash the powder with water, etc. after the contact.

It is preferable that an amount of the electrostatic charging-preventing compound remaining on the granular PTFE powder is from 10 to 300 ppm, particularly from 20 to 150 ppm on the basis of the granular PTFE powder. When the remaining amount is in the above-mentioned range, it is possible to decrease an electrostatic charge of the granular PTFE powder to not more than 50 V, preferably not more than 30 V, particularly not more than 10 V.

According to the preparation process of the present invention, it is possible to prevent the granular PTFE powder from being electrostatically charged even after dried substantially without lowering inherent properties of the granular PTFE powder, from lowering powder flowability and from sticking to a die for molding.

The preparation process of the present invention is then explained by means of examples, but the present invention is not limited to them.

The properties evaluated in examples and comparative examples are determined by the following methods.

Apparent density: Measured according to JIS K 6891-5.3.

Average particle size after pulverization (Primary particle size):

Wet sieve method: JIS standard sieves of 20 mesh (sieve opening: 840 μm), 250 mesh (sieve opening: 62 μm), 270 mesh (sieve opening: 53 μm), 325 mesh (sieve opening: 44 μm) and 400 mesh (sieve opening: 37 μm) are used. First, the 20 mesh sieve is placed on the 250 mesh sieve, and 5 g of a sample powder is put on the 20 mesh sieve. By spraying carbon tetrachloride carefully with a sprayer at a rate of about 3 liters/m² for about 30 seconds, the powder is rinsed on the lower sieve. When the sample powder has been rinsed completely, the upper sieve is removed and spraying all over the lower sieve is conducted for about four minutes. After that, the lower sieve is air-dried and a weight of the dried powder remaining thereon is measured. A series of the above-mentioned steps are repeated by using the 20 mesh sieve and each of the other three sieves of smaller meshes, respectively, and 5 g each of new sample powder is used. In order to obtain an accumulated weight percentage, the weights of the powder remaining on each sieve are multiplied by 20 and then those obtained values are plotted on a logarithmic probability paper to openings of each sieve. Those plotted points are connected with a line, particle sizes corresponding to the accumulated weight percentages 50($d_{50}$) and 84($d_{34}$) are read, and wet sieve size ($d_{ws}$) is calculated by the following equation.

$$\log_e d_{ws} = \log_e d_{50} - \frac{1}{2}\left(\log_e \frac{d_{34}}{d_{50}}\right)^2$$

Flowability: Measured in accordance with the method described in JP-A-3-259925.

Namely, there is used a measuring apparatus comprising a support base 42, an upper hopper 31 and a lower hopper 32. The both hoppers are aligned on their center lines and supported on the support base 42 as shown in FIG. 1 (corresponding to FIG. 3 described in JP-A-3-259925). The upper hopper 31 has an inlet 33 of 74 mm diameter, an outlet 34 of 12 mm diameter and a partition plate 35. The height from the inlet 33 to the outlet 34 is 123 mm. The partition plate 35 is provided on the outlet 34, and thereby the powder in the hopper can be kept therein and dropped optionally. The lower hopper 32 has an inlet 35 of 76 mm diameter, an outlet 37 of 12 mm diameter and a partition plate 38. The height from the inlet 35 to the outlet 37 is 120 mm, and the partition plate 38 is provided on the outlet 37 like the upper hopper. The upper hopper and the lower hopper are adjusted so that the distance between the both partition plates is 15 cm. In FIG. 1, numerals 39 and 40 represent outlet covers of each hopper, and numeral 41 represents a vessel for receiving the dropped powder.

Prior to measuring the flowability, about 200 g of powder is allowed to stand for not less than four hours in a room, the temperature of which is adjusted to 23.5° to 24.5° C., and then sieved with a 10 mesh sieve (sieve opening: 1,680 μm). The measurement of the flowability is carried out at the same temperature.

(I) At first, immediately after the upper hopper 31 is charged with just a cup of powder by using a 30 cc cup, the partition plate 35 is pulled out to drop the powder into the lower hopper. When the powder does not drop, the powder is stuck with a wire. After the powder has dropped completely into the lower hopper 32, the dropped powder is allowed to stand for 15±2 seconds, and then the partition plate 38 of the lower hopper is pulled out to see whether or not the powder is dropped from the outlet 37. When the powder is dropped completely within eight seconds, the powder is estimated to have been dropped as required.

(II) The same steps as above are repeated three times to see if the powder is dropped as required. In case where the powder is dropped satisfactorily twice or more, the flowability of the powder is estimated to be "Good". In case where the powder is never dropped, the flowability of the powder is estimated to be "Not good". In case where in three series of the dropping test, the powder has been dropped only one time, the dropping test is further conducted twice, and when the two series of the dropping test are both satisfactory, the flowability is estimated to be "Good". In other cases, the flowability is estimated to be "Not good".

(III) With respect to the powder estimated to be "Good", the upper hopper is charged with two cups of powder by using the same 30 cc cup, and the dropping test of the powder is conducted in the same manner as above. When as a result, the flowability is estimated to be "Good", the number of cups filled with the powder is increased successively and the dropping test is continued until the flowability is estimated to be "Not good". The dropping test is conducted up to eight cups at most. The powder having flowed out from the lower hopper in the previous dropping test may be re-used.

(IV) The larger the amount of the PTFE powder is, the more difficult to drop.

The number of cups when the flowability is estimated to be "Not good" is subtracted by 1, and the obtained value is taken as "Flowability" of the powder.

Average particle size and particle size distribution of granular powder: Standard sieves of 10, 20, 32, 48, 60 and 80 meshes (inch mesh) are placed in that order from the top, and granular PTFE powder is put on the 10 mesh sieve. The sieves are vibrated to drop smaller particles downward through each sieve in order. Then after the ratio of the powder remaining on each sieve is obtained by %, accumulated percentages (ordinate) of each remaining powder to the openings of each sieve (abscissa) are plotted on the logarithmic probability paper, and those points are connected with a line. The particle size, the proportion of which is 50% on that line, is obtained and is regarded as an average particle size. Also percents by weight of the granular powder remaining on each sieve of 10, 20, 32, 48, 60 and 80 meshes are regarded as the particle size distribution.

Remaining amount of electrostatic charge-preventing compound: 50 Grams of a granular PTFE powder is put in Vial bottle, and after the bottle is sealed, the powder is heated at 200° C. for 60 minutes to give a sample. Then 5 cc of a sample gas is collected from the Vial bottle by means of an injector, and an amount of the electrostatic charging-preventing compound is determined by gas chromatography.

Electrostatic charge: Handy Electrostatic Meter SFM775 available from Ion Systems, Inc. is used to determine an electrostatic charge.

Tensile strength (hereinafter may be referred to as "TS") and elongation (hereinafter may be referred to as "EL"): A die having an inner diameter of 100 mm is charged with 25 g of powder, and a pressure is applied gradually over about 30 seconds until the final pressure becomes about 300 kg/cm². Then that pressure is kept for two minutes to give a pre-molded article. The pre-molded article is taken out of the die mold and put in an electric oven being kept at 365° C. to be subjected to sintering for three hours. Then the sintered article is punched with a JIS dumbbell No. 3 to give a sample. A stress at break and elongation of the sample are measured in accordance with JIS K 6891-5.8 by stretching at a stretching rate of 200 mm/min with an autograph having a gross weight of 500 kg.

Whiteness (Z value): A 50 mm diameter die is filled with 200 g of a granular powder which is then maintained at a molding pressure of 300 kg/cm² for five minutes. The obtained pre-molded article (diameter: about 50 mm, thickness: 50 mm) is heated up from room temperature to 365° C. at a temperature raising rate of 50° C./hr. After having been maintained at 365° C. for 5.5 hours, the pre-molded article is cooled at a cooling rate of 50° C./hr and then the molded article is cut crosswise with a lathe at the point about 25 mm from its end (center portion). Then the Z value on the center of the cut portion is measured through Z value measuring method of the XYZ colorimetric system of Commission International de Leclairage.

EXAMPLES 1 to 4

A 200-liter granulation tank equipped with cone blades was charged with 120 to 150 liters of ion-exchanged water, and the inside temperature of the tank was adjusted to 20° to 28° C. Then the tank was charged with 30 kg of PTFE powder (POLYFLON TFE MOLDING POWDER M-12 available from DAIKIN INDUSTRIES, LTD., TFE homopolymer) prepared by suspension polymerization and pulverized into an average particle size of 34 μm. The corn blades were rotated at 400 rpm, and two to three minutes after, 19.1 kg of $CH_2Cl_2$ as an organic liquid was added in the tank. Subsequently the stirring was carried out at 400 rpm for five minutes to make the organic liquid and PTFE powder compatible with each other. After that, a product in the granulation tank was passed through a line mixer outside the tank for external circulation for ten minutes. The inside temperature of the tank was raised to 37° to 38° C. over 15 minutes and kept at that temperature for 60 minutes to distil off the organic liquid and give a granular PTFE powder. Physical properties of the obtained granular PTFE powder and physical properties of a molded article obtained from the granular PTFE powder were determined by the above-mentioned methods. The results are shown in Table 1.

The granular PTFE powder was subjected to the following if treatment for lowering its electrostatically charging property.

A 5% aqueous solution of surfactant was added to an aqueous dispersion of the above-mentioned granular PTFE powder in a concentration shown in Table 1 (concentration on the basis of the granular PTFE powder), followed by stirring for five minutes.

After the stirring was stopped, the granular powder was separated from water by using a 150 mesh sieve, and a collected granular powder was dried at 165° C. for 20 hours by using a box type hot air circulating dryer without washing with water to give the granular PTFE powder of the present invention which was subjected to treatment for lowering its electrostatically charging property.

Physical properties of the obtained granular PTFE powder which was subjected to the treatment for lowering its electrostatically charging property and physical properties of a molded article obtained from the granular PTFE powder were determined by the above-mentioned methods. The results are shown in Table 1.

Surfactants shown in Table 1 are those mentioned below.

DS-101: Ammonium perfluorooctanoate which is an anionic surfactant available from DAIKIN INDUSTRIES, LTD.

Puronon #208: A nonionic surfactant available from NOF Corporation and represented by the following formula:

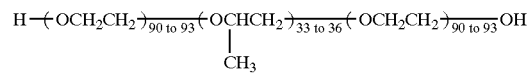

TABLE 1

| | Ex. 1 | | Ex. 2 | | Ex. 3 | | Ex. 4 | |
|---|---|---|---|---|---|---|---|---|
| | Before treated | After treated | Before treated | After treated | Before treated | After treated | Before treated | After treated |
| Conditions for treating for lowering electrostatically charging property | | | | | | | | |
| Kind of surfactant | — | DS-101 | — | DS-101 | — | Puronon #208 | — | Puronon #208 |
| Concentration of surfactant (% by weight based on granular PTFE powder) | — | 0.05 | — | 0.1 | — | 0.025 | — | 0.05 |
| Physical properties of granular powder | | | | | | | | |
| Apparent density (g/cm$^3$) | 0.83 | 0.83 | 0.82 | 0.82 | 0.85 | 0.85 | 0.83 | 0.83 |
| Flowability | 8.0 | 7.0 | 8.0 | 8.0 | 8.0 | 8.0 | 8.0 | 8.0 |
| Electrostatic charge (V) | 320.0 | 20.0 | 330.0 | 7.0 | 300.0 | 3.0 | 310.0 | 0.0 |
| Particle size distribution (% by weight) | | | | | | | | |
| 10 on | 0.0 | 0.0 | 0.0 | 0.0 | 0.0 | 0.0 | 0.0 | 0.0 |
| 20 on | 0.0 | 0.0 | 0.0 | 0.0 | 0.0 | 0.0 | 0.0 | 0.0 |
| 32 on | 4.0 | 4.4 | 5.0 | 5.4 | 6.6 | 6.7 | 4.1 | 4.0 |
| 48 on | 54.4 | 54.7 | 48.2 | 48.0 | 53.3 | 53.4 | 50.1 | 50.2 |
| 60 on | 21.8 | 20.5 | 17.8 | 17.6 | 16.5 | 16.2 | 18.0 | 18.1 |
| 80 on | 16.2 | 15.6 | 23.5 | 23.1 | 17.5 | 17.4 | 20.1 | 19.9 |
| 80 pass | 3.6 | 4.8 | 5.5 | 5.9 | 6.1 | 6.3 | 7.7 | 7.8 |
| Average particle size ($\mu$m) | 340 | 330 | 310 | 310 | 340 | 340 | 310 | 310 |
| Amount of remaining electrostatic charge-preventing compound (ppm) | — | 57 | — | 110 | — | 62 | — | 70 |
| Physical properties of molded article | | | | | | | | |
| TS (kg/cm$^2$G) | 430 | 390 | 400 | 400 | 390 | 390 | 400 | 400 |
| EL (%) | 400 | 380 | 390 | 390 | 390 | 390 | 390 | 390 |
| Whiteness (Z value) | 110.1 | 110.1 | 110.0 | 110.0 | 111.0 | 111.0 | 111.1 | 111.1 |

In the column of the particle size distribution of Table, 10 on, 20 on, 32 on, 48 on, 60 on and 80 on indicate the percentages of particles remaining on the 10 mesh, 20 mesh, 32 mesh, 48 mesh, 60 mesh and 80 mesh sieves, respectively. And, 80 pass represents the percentage of the particles passed through the 80 mesh sieve.

EXAMPLE 5

9.90 Kg (dry basis) of a PTFE powder (POLYFLON TFE MOLDING POWDER M-111 available from DAIKIN INDUSTRIES, LTD.: modified PTFE) having an average particle size of 25 $\mu$m after pulverizing and 1.10 kg of a glass fiber (average diameter: 12 $\mu$m, average fiber length: 80 $\mu$m) subjected to water repellent treatment previously with an aminosilane coupling agent were pre-mixed by using a 75-liter Henschel mixer.

A 10-liter granulation tank was charged with 6 liters of ion-exchanged water and 2 kg of the above-mentioned mixture obtained by pre-mixing the PTFE powder and glass fiber. Thereto was added 1,200 ml of methylene chloride (organic liquid forming a liquid-liquid interface with water), followed by stirring at 800 rpm at 25° C.±2° C. for five minutes with cone blades for granulation.

Further the stirring was continued at 2,000 rpm for two minutes by using dispersing blades of 100 mm diameter.

Then after shaping of the powder was carried out at 25° C.±2° C. for ten minutes under stirring at 800 rpm with cone blades, the inside temperature of the tank was raised up to 38° C. over 20 minutes to give a granular PTFE powder.

Physical properties of the obtained granular PTFE powder and physical properties of a molded article obtained from the granular PTFE powder were determined by the above-mentioned methods. The results are shown in Table 2.

The obtained granular PTFE powder was subjected to the following treatment for lowering its electrostatically charging property.

To the aqueous dispersion of the above-mentioned granular PTFE powder was added a 5% aqueous solution of Puronon #208 which is a nonionic surfactant, in a concentration shown in Table 1, followed by stirring at 400 rpm for five minutes. After the stirring was stopped, the granular powder was separated by using a 150 mesh sieve and the collected granular powder was dried at 165° C. for 16 hours with a box type hot air circulation dryer without washing with water, thus giving a filler-containing granular PTFE powder subjected to treatment for lowering electrostatically charging property.

Physical properties of the obtained granular PTFE powder subjected to treatment for lowering electrostatically charging property and physical properties of a molded article obtained from the granular PTFE powder were determined by the above-mentioned methods. The results are shown in Table 2.

EXAMPLE 6

9.90 Kg (dry basis) of a modified PTFE powder (POLYFLON TFE MOLDING POWDER M-111 available from DAIKIN INDUSTRIES, LTD.) having an average particle size of 25 μm after pulverizing and 1.10 kg of a wholly aromatic polyester resin powder (ECONOL available from Sumitomo Chemical Industries, Ltd., finely pulverized powder, average particle size: 30 to 40 μm) were pre-mixed by using a 75-liter Henschel mixer.

A 10-liter granulation tank was charged with 6 liters of ion-exchanged water and 2 kg of the mixture obtained by the above-mentioned pre-mixing of the PTFE powder and ECONOL. Thereto was added 1,200 ml of methylene chloride (organic liquid forming a liquid-liquid interface with water), followed by stirring at 800 rpm at 25° C.±2° C. for five minutes with cone blades for granulation.

Further the stirring was continued at 2,000 rpm for two minutes by using dispersing blades of 100 mm diameter.

Then after shaping of the powder was carried out at 25° C.±2° C. for ten minutes under stirring at 800 rpm with cone blades, the inside temperature of the tank was raised up to 38° C. over 20 minutes to give a granular PTFE powder. Physical properties of the obtained granular PTFE powder and physical properties of a molded article obtained from the granular PTFE powder were determined by the above-mentioned methods. The results are shown in Table 2.

The obtained granular PTFE powder was subjected to the following treatment for lowering electrostatically charging property.

To the aqueous dispersion of the above-mentioned granular PTFE powder was added a 5% aqueous solution of sodium tetradecenesulfonate (SOS) which is an anionic surfactant, in a concentration shown in Table 2, followed by stirring at 400 rpm for five minutes. After the stirring was stopped, the granular powder was separated by using a 150 mesh sieve and the collected granular powder was dried at 165° C. for 16 hours with a box type hot air circulation dryer without washing with water, thus giving a filler-containing granular PTFE powder subjected to treatment for lowering electrostatically charging property.

Physical properties of the obtained granular PTFE powder subjected to the treatment for lowering electrostatically charging property and physical properties of a molded article obtained from the granular PTFE powder were determined by the above-mentioned methods. The results are shown in Table 2.

TABLE 2

|  | Ex.5 | | Ex.6 | |
| --- | --- | --- | --- | --- |
|  | Before treated | After treated | Before treated | After treated |
| Conditions for treating for lowering electrostatically charge property | | | | |
| Kind of surfactant | — | Puronon #208 | — | SOS |
| Concentration of surfactant (% by weight based on granular PTFE powder) | — | 0.025 | — | 0.025 |
| Characteristics of granular powder | | | | |
| Apparent density (g/cm³) | 0.76 | 0.76 | 0.70 | 0.70 |
| Flowability | 8.0 | 8.0 | 8.0 | 8.0 |
| Electrostatic charge (V) | 120.0 | 0.0 | 220.0 | 0.0 |
| Particle size distribution (%) | | | | |
| 10 on | 0.0 | 0.0 | 0.0 | 0.0 |
| 20 on | 5.8 | 6.0 | 16.3 | 16.4 |
| 32 on | 47.9 | 49.7 | 32.5 | 32.9 |
| 48 on | 39.7 | 39.6 | 30.0 | 29.7 |
| 60 on | 5.1 | 3.4 | 9.7 | 9.6 |
| 80 on | 1.1 | 1.0 | 8.0 | 7.8 |
| 80 pass | 0.4 | 0.4 | 2.5 | 2.6 |
| Average particle size (μm) | 540 | 540 | 500 | 500 |
| Remaining amount of electrostatic charge-preventing compound (ppm) | — | 60 | — | 68 |
| Physical properties of molded article | | | | |
| TS (kgf/cm²G) | 160 | 160 | 160 | 1190 |
| EL (%) | 328 | 328 | 300 | 3 |
| Whiteness (Z value) | 96.7 | 96.7 | — | 111.1 |

INDUSTRIAL APPLICABILITY

According to the present invention, electrostatic charging of the granular powder can be inhibited even after drying, and good powder flowability can be maintained at the time of transportation and molding.

What is claimed is:

1. A process for preparing a low-electrostatically-charging granular polytetrafluoroethylene powder prepared by contacting a nonionic surfactant having an electrostatic charging-preventing ability when substantially dry to a granular polytetrafluoroethylene powder, and then drying the granular powder without washing while the nonionic surfactant is kept remaining in the powder, said nonionic surfactant is contacted in the form of an aqueous solution at a concentration of not more than 0.05% by weight to the granular polytetrafluoroethylene powder.

2. The preparation process claim 1, wherein the granular polytetrafluoroethylene powder does not contain a filler.

3. The preparation process of claim 1, wherein the granular polytetrafluoroethylene powder contains an electrically insulating filler.

4. A granular polytetrafluoroethylene powder which contains a segmented polyalkylene glycol in an amount of 10 to 70 ppm and has an electrostatic charge of not more than 10 V.

5. The granular polytetrafluoroethylene powder of claim 4, wherein the granular polytetrafluoroethylene powder does not contain a filler.

6. The granular polytetrafluoroethylene powder of claim 4, wherein the granular polytetrafluoroethylene powder contains an electrically insulating filler.

* * * * *